Figure 1:
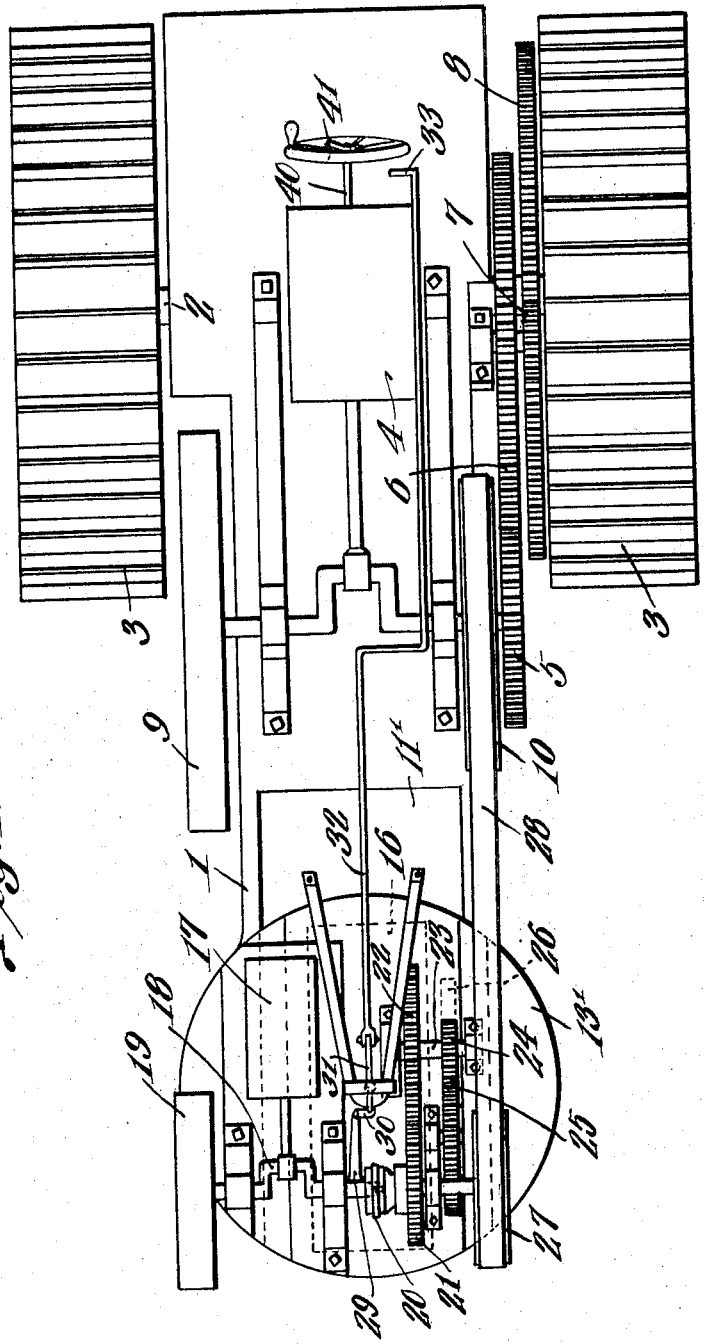

M. W. PATTON.
TRACTOR.
APPLICATION FILED FEB. 27, 1912.

1,126,850.

Patented Feb. 2, 1915.
2 SHEETS—SHEET 1.

Witnesses

M. W. Patton,
Inventor
by
Attorneys

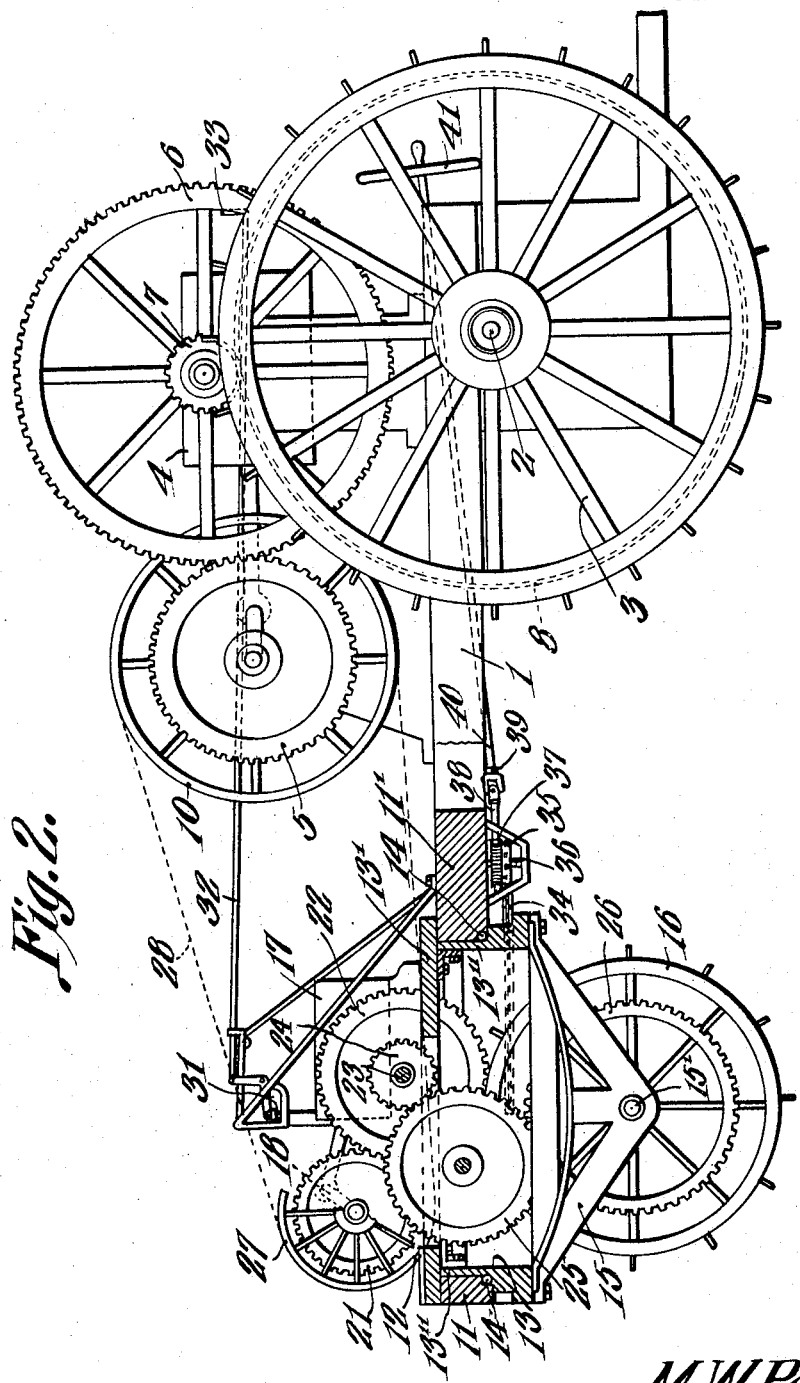

UNITED STATES PATENT OFFICE.

MATTHEW W. PATTON, OF NEWBERG, OREGON.

TRACTOR.

1,126,850.

Specification of Letters Patent.

Patented Feb. 2, 1915.

Application filed February 27, 1912. Serial No. 680,262.

*To all whom it may concern:*

Be it known that I, MATTHEW W. PATTON, a citizen of the United States, residing at Newberg, in the county of Yamhill and State of Oregon, have invented a new and useful Tractor, of which the following is a specification.

The present invention relates to improvements in tractors, the primary object of the invention being the provision of a tractor provided with two rear tractor wheels and a single steering tractor at the forward end thereof, the rear tractors being provided with an individual motor while the forward tractor is provided with its individual motor, thus providing a means whereby the full draw bar or traction effect is imparted throughout the full length of the tractor, and further a means whereby the forward end of the tractor may be turned at right angles in steering without the danger of skidding, where the forward wheels are merely steering wheels.

A further object of the present invention is the novel form of tractor having rear tractor wheels driven by a single motor in combination with a turn table disposed at the front end of the frame of the tractor and carrying a single tractor and its operating motor, such arrangement distributing the tractor or drawing power at both ends of the frame of the tractor and giving the maximum pulling power to a machine of this character, whereby the power necessary to push the ordinary steering wheels is dispensed with, every unit of power being employed to the best advantage both in agricultural and in road work.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a top plan view of a complete tractor made according to and embodying the present invention. Fig. 2 is a side elevation thereof, a section being taken through the forward part of the frame and turn table to show the mechanism carried by and the mounting of the turn table.

Referring to the drawings, the numeral 1 designates the main frame of the tractor carrying the rear axle 2 upon which are keyed the two rear tractor wheels 3 which are disposed as is usual, the explosive engine 4 for driving the rear tractors being mounted upon the frame with the greatest portion of the weight above the rear axle. The crank shaft of the engine carries upon one end a large gear 5 which operates the intermediate gear 6 carrying the small gear 7 which in turn meshes with and operates the large gear 8 keyed upon one of the tractor wheels 3 as clearly shown in Fig. 1. By this means the operation of the engine 4 will impart rotation to the rear tractor wheels 3.

The crank shaft of the engine 4 is provided upon one side with the fly wheel 9 and upon the other side with the drive pulley 10, the purpose of which will later appear.

Carried by the front part of the frame 1 is a metal ring 11 having the enlarged portion 11' connected to the frame 1 and constituting the forward open portion of the main frame of the machine. This ring has rotatably mounted therein a band or rim 13 which has secured thereto the turn table 13' by means of the angle ring 13", the lower portion of the ring 13 being projected below the metal ring 11 to form a drum, while the turn table 13' rests thereupon and also upon the upper surface of the enlarged portion 11'. In order to reduce the friction between the turn table and the open ring 11, the anti-frictional bearings 14 are employed.

Connected to the under side and carried by the turn table are the frames 15 which have journaled therein the axle 15' carrying the forward tractor wheel 16, said tractor wheel 16 being disposed in the longitudinal center of the main frame of the machine as clearly shown in Fig. 1.

Mounted upon the turn table 13' is an explosive engine 17 which operates the crank 18 and the fly or balance wheel 19, and through the clutch 20 transmits motion to the gear 21, which in turn meshes with the gear 22 mounted upon the counter shaft 23 carrying the small gear 24. The gear 24 meshes with the intermediate gear 25 also carried by the turn table and through the gear 25 transmits motion to the gear 26 carried by the tractor wheel 16. Thus the operation of the motor or engine 17 will control the rotation of the tractor wheel 16 and with the tractor wheels 3 provides independently propelled tractor means at the respective front and rear ends of the machine.

Mounted upon the crank shaft 18, upon the same side as the fly wheel 10, is the drive wheel 27, which is connected to the drive wheel 10 through a belt 28, thus providing a means whereby the two engines 4 and 17 may be coupled for simultaneous operation when it is desired to operate the motors or engines for driving threshing machines or other like machinery when the tractor is in a stationary position. Either fly wheel 9 or 10 is then employed to attach the belt for operating the machinery, or the belt 28 may be thrown and the two motors or engines operated separately to drive two different mechanisms.

In order to operate the clutch 20 to throw the forward tractor operating mechanism into or out of operable relation to the motor or engine 17, a bell crank lever 29 is situated in the frame carried by the turn table 13' and is itself connected to the small bell crank lever 30, which is controlled by means of the links 31 and the long connecting rod 32 which extends to the rear of the machine and is provided with the operating handle 33, so that the clutch may be controlled by a person standing at the rear and operating the machine.

In order to oscillate the turn table and consequently the forward tractor 16, to steer the tractor, the chain 34 is connected to the drum formed by the lower portion of the ring 13 at diametrically opposite points thereof and extends rearwardly around the sprocket 35 mounted in the frame 36 and carrying the worm 37 which is operably connected to the short shaft 38, which through the flexible connection 39 is connected to the operating shaft 40 which extends rearwardly and carries the steering wheel 41 which is placed in such position that both it and the lever 33 may be operated by the person for controlling the direction and speed of the machine.

From the foregoing description taken in connection with the drawings, it is evident that with a tractor constructed according to the present invention, the skidding of either set of wheels is prevented, and by reason of the fact that the tractor 16 is carried by a turn table which is capable of being rotated a full 90° in either direction the tractor will turn in the shortest possible space, approximately the full length of the machine with the rear tractors as the center, and further that the tractor power being imparted to the surface at both ends of the frame, the liability of skidding is reduced to a minimum while the traction power of the machine is increased.

By reason of the fact that the forward tractor 16 is provided with its individual motor and further is not pushed or propelled by the rear tractor wheels as is the usual case, the full engine power may be employed entirely for traction purposes and not for propelling dead weight as is the case where the forward wheel is simply a steering wheel.

Although, there are shown rear traction wheels, it is evident that a baling press mechanism may be attached in lieu of the traction wheels 3, and thus provide a portable traction baling press, with the front wheel the load puller.

What is claimed is:

A steering tractor including a member for attachment to a frame, said members having a circular opening, a ring mounted for rotation within the opening and having an enlarged lower portion extending under said member and forming a drum, a tractor wheel under and connected to the ring, the upper portion of the wheel projecting upwardly into the ring, a table secured upon the ring and extending over a portion of the structure, a motor mounted upon the table, means mounted on the table and within the ring for transmitting motion from said motor to the wheel, and flexible means connected to the drum portion of the ring at diametrically opposed points, for rotating the ring within the opening in the structure.

In testimony that I claim the foregoing as my own, I have hereto affixed my signature in the presence of two witnesses.

MATTHEW W. PATTON.

Witnesses:
C. R. CHAPIN,
D. D. COULSON.